June 9, 1953  H. W. MULCAHY  2,641,463
FRICTION SNUBBER FOR RAILWAY CAR TRUCK SPRINGS
Filed April 1, 1950  2 Sheets-Sheet 1
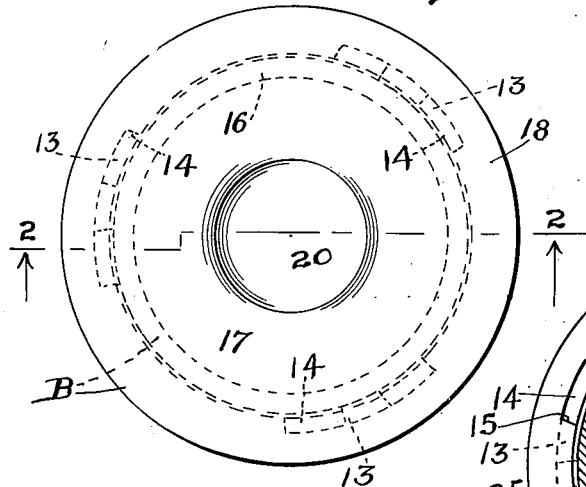
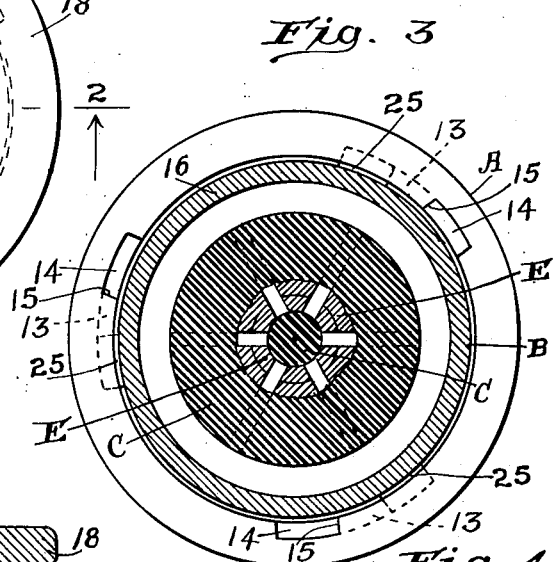
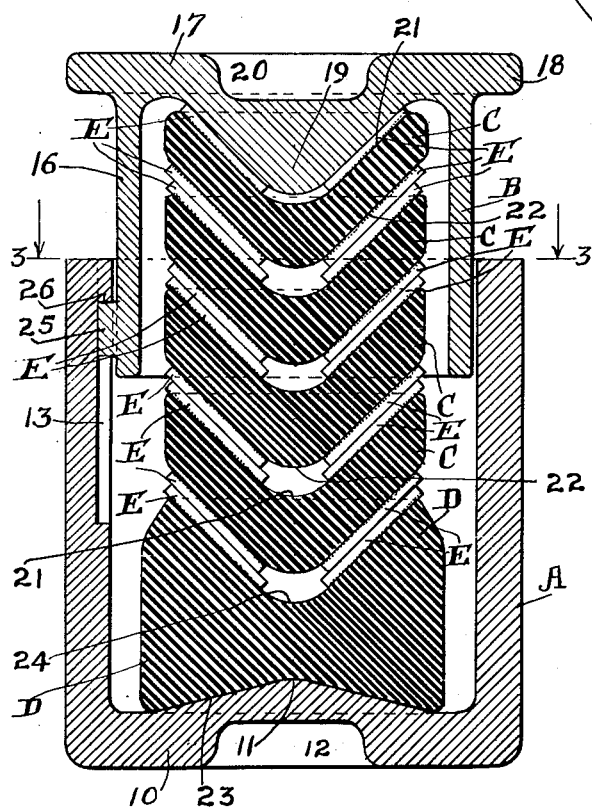
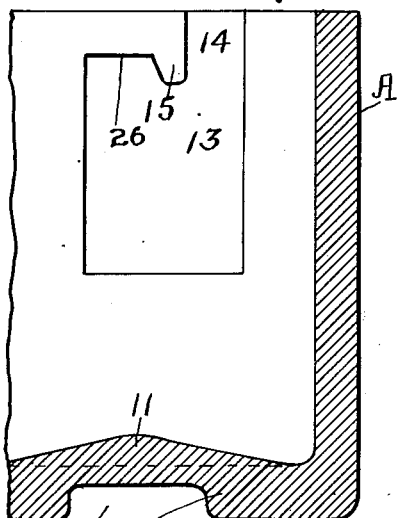
Inventor.
Harry W. Mulcahy.
By Henry Fuchs
Atty.

June 9, 1953 H. W. MULCAHY 2,641,463
FRICTION SNUBBER FOR RAILWAY CAR TRUCK SPRINGS
Filed April 1, 1950 2 Sheets-Sheet 2
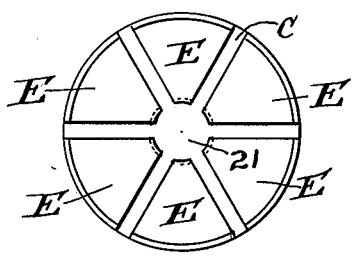
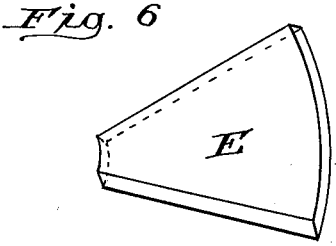
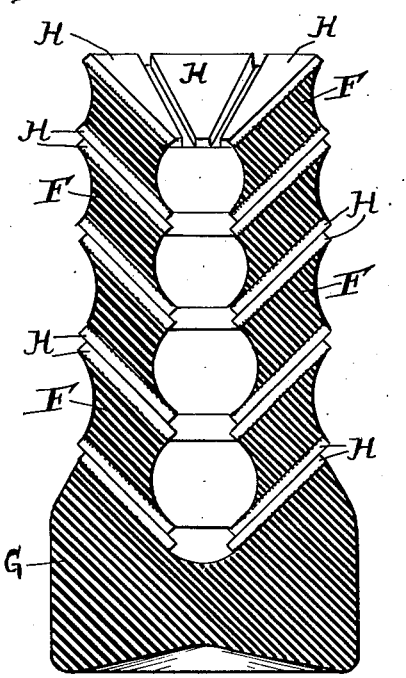
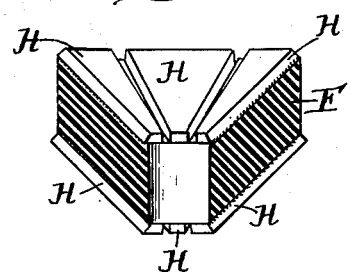
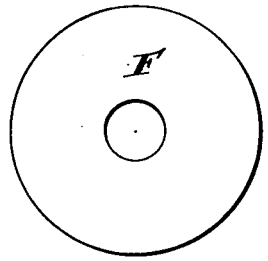
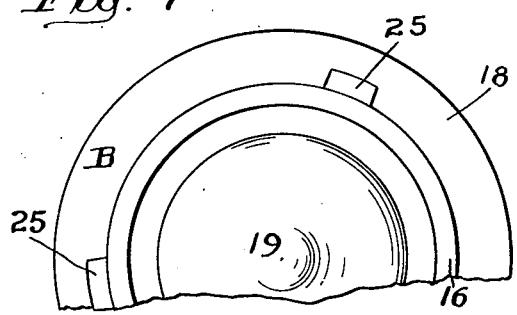
Inventor:
Harry W. Mulcahy.
By Henry Fuchs
Atty.

Patented June 9, 1953

2,641,463

UNITED STATES PATENT OFFICE 2,641,463

FRICTION SNUBBER FOR RAILWAY CAR TRUCK SPRINGS

Harry W. Mulcahy, Chicago, Ill., assignor to W. H. Miner, Inc., Chicago, Ill., a corporation of Delaware Application April 1, 1950, Serial No. 153,457

9 Claims. (Cl. 267—9)

This invention relates to improvements in friction shock absorbers especially adapted for use in connection with truck springs of railway cars for snubbing or dampening the vertical action of the springs.

One object of the invention is to provide a friction shock absorber of the character indicated, including a plurality of rubber elements placed under both compression and shear to dampen or snub the action of the truck springs, during compression of the shock absorber.

A more specific object of the invention is to provide a friction shock absorber as set forth in the preceding paragraph, wherein the rubber elements of the mechanism are arranged in series within a casing and are adapted to be compressed by a member which is slidingly telescoped within the casing, each rubber element being separated from the adjacent rubber element of the series by metal plates which are vulcanized to the respective elements, the plates and faces of the rubber elements to which the plates are secured being inclined, whereby, when the mechanism is compressed, the rubber elements are placed under both compression and shear to provide yielding resistance, and the plates are forced to slide on each other to provide frictional resistance.

Other objects of the invention will more clearly appear from the description and claims hereinafter following.

In the accompanying drawings forming a part of this specification, Figure 1 is a top plan view of my improved friction shock absorber. Figure 2 is a vertical sectional view, corresponding substantially to the line 2—2 of Figure 1. Figure 3 is a horizontal sectional view, corresponding substantially to the line 3—3 of Figure 2. Figure 4 is an enlarged, vertical sectional view, partly broken away, of the casing of my improved shock absorber, illustrating the structure of the interior guideway of the casing within which the locking lug of the follower sleeve of my improved shock absorber is engaged. Figure 5 is a top plan view of the top rubber element and associated friction plates of my improved shock absorber. Figure 6 is a perspective view of one of the friction plates. Figure 7 is a broken bottom view of the follower shown in Figure 2. Figure 8 is a vertical sectional view of a series of rubber elements and friction plates, of modified form. Figure 9 is a vertical sectional view of the top element shown in Figure 8. Figure 10 is a top plan view of one of the rubber elements shown in Figure 9.

Referring first to the embodiment of the invention illustrated in Figures 1 to 7, inclusive, my improved shock absorber comprises broadly a casing A, a follower B slidingly telescoped within the casing A, a plurality of rubber pads C—C—C—C and D arranged in series, and cooperating friction plates E—E and E—E interposed between adjacent pads and vulcanized, respectively, to said adjacent pads.

The casing A is in the form of a tubular member of cylindrical, transverse cross section, open at its upper end and having a transverse bottom wall 10 at its lower end. The bottom wall is provided with an upstanding conical projection 11 on its inner side, and has a central, downwardly opening seat 12 on its outer side adapted to accommodate the usual spring centering lug of the bottom spring follower plate of a cluster of truck springs. At the open upper end, the casing A is provided with three circumferentially spaced interior guide slots 13 of bayonet formation, each slot 13 having a restricted outlet 14 at its upper end, and a depending stop lug 15 to the left of the outlet, as seen in Figure 4.

The follower B comprises a cylindrical sleeve portion 16 telescoped within the upper end of the casing A, and a transverse top wall 17 closing the upper end of the sleeve portion 16. The top wall 17 is extended laterally outwardly beyond the sleeve portion 16 to provide a peripheral flange 18 adapted to engage with the upper end of the casing A to restrict inward movement of the follower B. The wall 17 is provided with a depending conical wedge projection 19 on its underneath side, which cooperates with the topmost rubber pad C of the series of rubber pads disposed within the casing A. The upper side of the wall 17 is recessed to provide an upwardly opening seat 20, adapted to receive the usual spring centering projection of the top follower plate of a cluster of truck springs of a railway car.

The rubber pads C—C—C—C and the pad D are arranged within the casing A, the pads C—C—C—C being superimposed upon the pad D. The pads C—C—C—C are all of similar design, except as hereinafter pointed out. Each pad C is in the form of a heavy rubber disc of dished formation, presenting a depressed conical surface 21 on its upper side and a protruding conical surface 22 on its bottom side complementary to the depressed conical surface 21 of the pad C which is beneath the same. The rubber pads C of the series are of progressively increasing thickness, considered from top to bottom of the series. The pad D is in the form of a cylindrical block recessed at its bottom end to provide a conical seat 23, interfitting with the conical projection 11 on the bottom wall 10 of the casing A. At its upper side, the rubber block D is provided with a depressed conical surface 24 complementary to the protruding bottom conical surface 22 of the lowermost pad C of the series of pads C—C—C—C.

The friction plates E comprise top and bottom sets E—E and E—E associated with each pad C, and a top set associated with the pad D. Each set of plates preferably comprises six plates arranged in annular series, each plate having inwardly converging side edges, which are radial to the central vertical axis of the mechanism, and curved inner and outer edges. The plates E of each annular series are spaced apart circumferentially of the mechanism, as shown in Figure 5. The sets of top and bottom plates E—E and E—E, associated with the pads C, are vulcanized to said pads, and the set of plates E—E, associated with the pad D, is vulcanized to the latter. As shown most clearly in Figure 2, the top plates E of the topmost pad C are engaged by the conical wedge projecton 19 of the follower B and the set of bottom plates E of each pad C directly engages the set of plates E of the pad C which is therebeneath, with the exception of the bottom plates E of the lowermost pad C, which plates directly engage the top plates of the pad D. As will be evident, the cooperating plates E and E of the bottom and top sets of adjacent pads are capable of relative sliding movement with respect to each other and are in frictional contact.

The follower B has its upward movement away from the casing A limited, and is held assembled with the casing by radially outwardly projecting retaining lugs 25 engaged in the bayonet slots 13 and shouldering against the stop shoulders 26 formed by the transverse outer end walls of these slots.

My improved shock absorber preferably replaces one or more of the spring units of a truck spring cluster of a railway car, being interposed between the top and bottom spring plates of said cluster.

The operation of my improved shock absorber, as shown in Figures 1 to 7 inclusive, is as follows: Upon the spring cluster of the truck of a railway car being compressed between the spring follower plates of the cluster, the follower B is forced downwardly with respect to the casing A, thereby compressing the rubber pads C—C—C—C and D between the wedge projection 19 of the follower B and the conical projection 11 on the bottom wall 10 of the casing A. During this compression of the rubber pads lengthwise of the mechanism, the pads are also placed under shear, due to the inclination of their cooperating surfaces and the ability of the metal plates associated with the pads to slide on each other. In addition to the resistance offered by the compression and shearing action of the rubber pads, frictional resistance is provided by relative sliding movement of the plates E—E on each other.

Referring next to the embodiment of the invention illustrated in Figures 8, 9, and 10, the structure shown in these figures comprises a series of rubber pads F—F—F—F and G, and plates H, similar to the rubber pads C—C—C—C and D and plates E hereinbefore described, with the exception that the pads F—F—F—F are in the form of rings, instead of discs, thus providing a central opening in each pad to permit freer flow of the rubber of the pad and provide for greater shearing action, as well as greater relative movement, of the cooperating friction plates H—H with respect to each other.

As will be understood, the series of pads F—F—F—F and G, together with the plates H, which are vulcanized to these pads, are employed with a casing and follower similar to the casing A and follower B hereinbefore described, being arranged within the casing in the same manner as the pads C—C—C—C and D and the plates E.

I claim:

1. In a friction shock absorbing mechanism, the combination with a pair of members relatively movable toward and away from each other lengthwise of the mechanism; of yielding means interposed between and bearing on said members, respectively, said yielding means comprising a plurality of rubber pads arranged in series lengthwise of the mechanism, adjacent pads having respectively opposed, complementary surfaces diverging outwardly away from the longitudinal central axis of the mechanism, and two sets of friction plates with the plates of said sets in sliding contact with each other interposed between adjacent pads, said sets of plates being secured to said pads, respectively, certain plates of each set being at opposite sides of the longitudinal center line of the mechanism.

2. In a friction shock absorbing mechanism, the combination with a pair of members relatively movable toward and away from each other lengthwise of the mechanism; of yielding means interposed between and bearing on said members, said yielding means comprising a plurality of rubber pads arranged in series lengthwise of the mechanism, adjacent pads presenting opposed, complementary surfaces, said surface of each pad presenting portions diverging from the central longitudinal axis of the mechanism, and friction plates at opposite sides of the central longitudinal axis of the mechanism fixed respectively to said diverging surface portions of each pad, said plates of each pad being slidingly engaged with the friction plates of the adjacent pad.

3. In a friction shock absorbing mechanism, the combination with a pair of members relatively movable lengthwise of the mechanism toward and away from each other; of yielding means interposed between and bearing on said members, respectively, said yielding means comprising a plurality of adjacent rubber pads having opposed, complementary, conical surface portions, an annular series of friction plates fixed to said conical surface portions of each of said pads and slidingly engaged with the friction plates of the series fixed to the adjacent pad.

4. In a friction shock absorbing mechanism, the combination with a top member; of a bottom member, said top member being movable downwardly toward said bottom member; yielding means interposed between said members, said yielding means including a plurality of rubber pads arranged in series vertically of the mechanism, adjacent of said pads having complementary, projecting and depressed surfaces, a set of annularly arranged friction plates secured to one of said complementary surfaces, and a second set of annularly arranged friction plates in sliding frictional contact with said first named set, said second named set being secured to the other of said complementary surfaces.

5. In a friction shock absorbing mechanism, the combination with a casing; of a top follower slidingly telescoped within the casing; a depending conical projection on said follower; a plurality of superimposed rubber pads arranged in series within said casing, the topmost pad having a depressed conical seat complementary to said conical projection of the follower; an annularly arranged series of friction plates interposed between said conical projection and said topmost pad, said plates being fixed to the latter and having sliding contact with said conical projection, the opposed faces of adjacent pads of said series having complementary conical projections and conical depressions, and two sets of annularly arranged friction plates interposed between adjacent of said pads, the plates of one set being in frictional engagement, respectively, with the plates of the other set, and the plates of each of said respective sets being fixed to said adjacent pads, respectively.

6. In a friction shock absorbing mechanism, the combination with a pair of members relatively movable toward and away from each other lengthwise of the mechanism; of yielding means interposed between and bearing on said members, respectively, said yielding means comprising a plurality of rubber discs arranged in series lengthwise of the mechanism, adjacent discs having respectively opposed, complementary surfaces diverging outwardly away from the longitudinal central axis of the mechanism, and two sets of contacting friction plates interposed between adjacent discs, the plates of one set being in sliding engagement with the plates of the other set, said sets of plates being secured to said discs, respectively.

7. In a friction shock absorbing mechanism, the combination with a pair of members relatively movable toward and away from each other lengthwise of the mechanism; of yielding means interposed between and bearing on said members, respectively, said yielding means comprising a plurality of rubber discs arranged in series lengthwise of the mechanism, each disc having a central opening therethrough, adjacent discs having respectively opposed, complementary surfaces diverging outwardly away from the central openings of said discs, and contacting sets of friction plates in sliding engagement with each other interposed between adjacent discs, and surrounding said openings of the discs, said respective sets of plates being secured to said discs, respectively.

8. A shock absorbing mechanism adapted to be compressed between two members relatively movable toward each other, said mechanism comprising at least two rubber pads, and two sets of friction plates interposed between said pads, said pads being in longitudinal alignment lengthwise of the mechanism, the friction plates of each of said sets including a pair of plates at opposite sides of the longitudinal central axis of the mechanism, inclined toward each other, said pair of plates of said respective sets being secured to said pads respectively, said pair of plates of one of said sets being in sliding frictional engagement with said pair of plates of the other set.

9. In a friction shock absorbing mechanism, the combination with a pair of members relatively movable toward and away from each other lengthwise of the mechanism; of yielding means interposed between said members and compressible thereby upon relative approach of the same, said yielding means comprising a plurality of rubber pads arranged in series lengthwise of the mechanism, adjacent pads of said series having opposed complementary surface portions, each of said opposed surface portions including sections located at opposite sides of the longitudinal central axis of the mechanism, oppositely inclined with respect to each other, and oppositely inclined friction plates, respectively, at opposite sides of the central longitudinal axis of the mechanism secured to each of said opposed complementary surface portions of said pads, the plates which are secured to each of said pads being in sliding frictional engagement with the plates of the adjacent pad.

HARRY W. MULCAHY.

References Cited in the file of this patent

UNITED STATES PATENTS

| Number | Name | Date |
|---|---|---|
| 7,706 | Ray | Oct. 8, 1850 |
| 2,260,532 | Lindeman | Oct. 28, 1941 |

FOREIGN PATENTS

| Number | Country | Date |
|---|---|---|
| 259,848 | Great Britain | Oct. 21, 1926 |
| 549,020 | Great Britain | Nov. 3, 1942 |
| 884,677 | France | May 3, 1943 |